US012508605B2

(12) United States Patent
Dai

(10) Patent No.: US 12,508,605 B2
(45) Date of Patent: Dec. 30, 2025

(54) HANDHELD WATER SPRAYER

(71) Applicant: Wenzhou BOYU Technology Co., Ltd., Zhejiang (CN)

(72) Inventor: Lingfang Dai, Zhejiang (CN)

(73) Assignee: Wenzhou BOYU Technology Co., Ltd., Wenzhou (CN)

(*) Notice: Subject to any disclaimer, the term of this patent is extended or adjusted under 35 U.S.C. 154(b) by 0 days.

(21) Appl. No.: 18/983,419

(22) Filed: Dec. 17, 2024

(65) Prior Publication Data

US 2025/0128275 A1 Apr. 24, 2025

(30) Foreign Application Priority Data

Oct. 20, 2023 (CN) ......................... 202322821236.9
Nov. 13, 2024 (CN) ......................... 202430719193.0
Dec. 6, 2024 (CN) ......................... 202423003616.2

(51) Int. Cl.
*B05B 1/16* (2006.01)
*B05B 12/00* (2018.01)

(52) U.S. Cl.
CPC .......... *B05B 1/1681* (2013.01); *B05B 1/1654* (2013.01); *B05B 12/0022* (2018.08)

(58) Field of Classification Search
CPC . B05B 1/1681; B05B 12/0022; B05B 1/1645; B05B 1/1654
USPC .................................................. 239/562, 394
See application file for complete search history.

(56) References Cited

U.S. PATENT DOCUMENTS

2023/0356246 A1* 11/2023 Huang ...................... B05B 1/18
2024/0018765 A1* 1/2024 Stadtler ................. E03C 1/0405

FOREIGN PATENT DOCUMENTS

EP 0656503 A1 * 7/1997 ............. F16L 55/05

* cited by examiner

*Primary Examiner* — Qingzhang Zhou
*Assistant Examiner* — Kevin Edward Schwartz

(57) ABSTRACT

The present disclosure provides a handheld water sprayer. The handheld water sprayer includes a handle and a spray head. The handle includes a holding body and a pressing member. The holding body defines an inlet channel, and the pressing member is slidably mounted on the holding body and extends into the inlet channel to adjust a flow rate of the inlet channel. The spray head is rotatably mounted on the holding body, and the spray head defines a first outlet channel and a second outlet channel. Rotating the spray head enables at least one of the first outlet channel and the second outlet channel to be communicated to the inlet channel. In this way, a water outlet mode can be switched by rotating the spray head, which is simple to operate. Moreover, the handheld water sprayer can be applied to various scenarios.

19 Claims, 19 Drawing Sheets

HANDHELD WATER SPRAYER

CROSS-REFERENCE TO RELATED APPLICATIONS

This application claims the priorities of the Chinese patent application No. 2023228212369, filed on Oct. 20, 2023, Chinese patent application No. 2024307191930, filed on Nov. 13, 2024, and Chinese patent application No. 2024230036162, filed on Dec. 6, 2024, the disclosure of which are hereby incorporated by reference in their entireties.

FIELD

The present disclosure relates to the technical field of water outlet devices, and particularly to a handheld water sprayer.

BACKGROUND

Handheld water spraying guns are widely used in cleaning and gardening tasks, and are often used in scenarios where a water outlet direction needs to be changed, such as when scouring oil stains, washing vehicles, cleaning the ground, and cleaning surfaces of walls and equipment.

In the prior art, handheld water spraying guns generally have only a single water outlet mode, so they can only be applied to a single water using scenario. For example, spray type water outlet spray guns are used for garden irrigation, while straight shooting water outlet spray guns are used in kitchen cleaning scenarios. These water spraying guns have a single water outlet function and can hardly meet diverse usage requirements.

SUMMARY

The present disclosure provides a handheld water sprayer. The handheld water sprayer includes a handle and a spray head. The handle includes a holding body and a pressing member. The holding body defines an inlet channel, and the pressing member is slidably mounted on the holding body and extends into the inlet channel to adjust a flow rate of the inlet channel. The spray head is rotatably mounted on the holding body, and the spray head defines a first outlet channel and a second outlet channel. Rotating the spray head enables at least one of the first outlet channel and the second outlet channel to be communicated to the inlet channel.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

REFERENCE NUMERALS IN THE DRAWINGS

Figure 1:
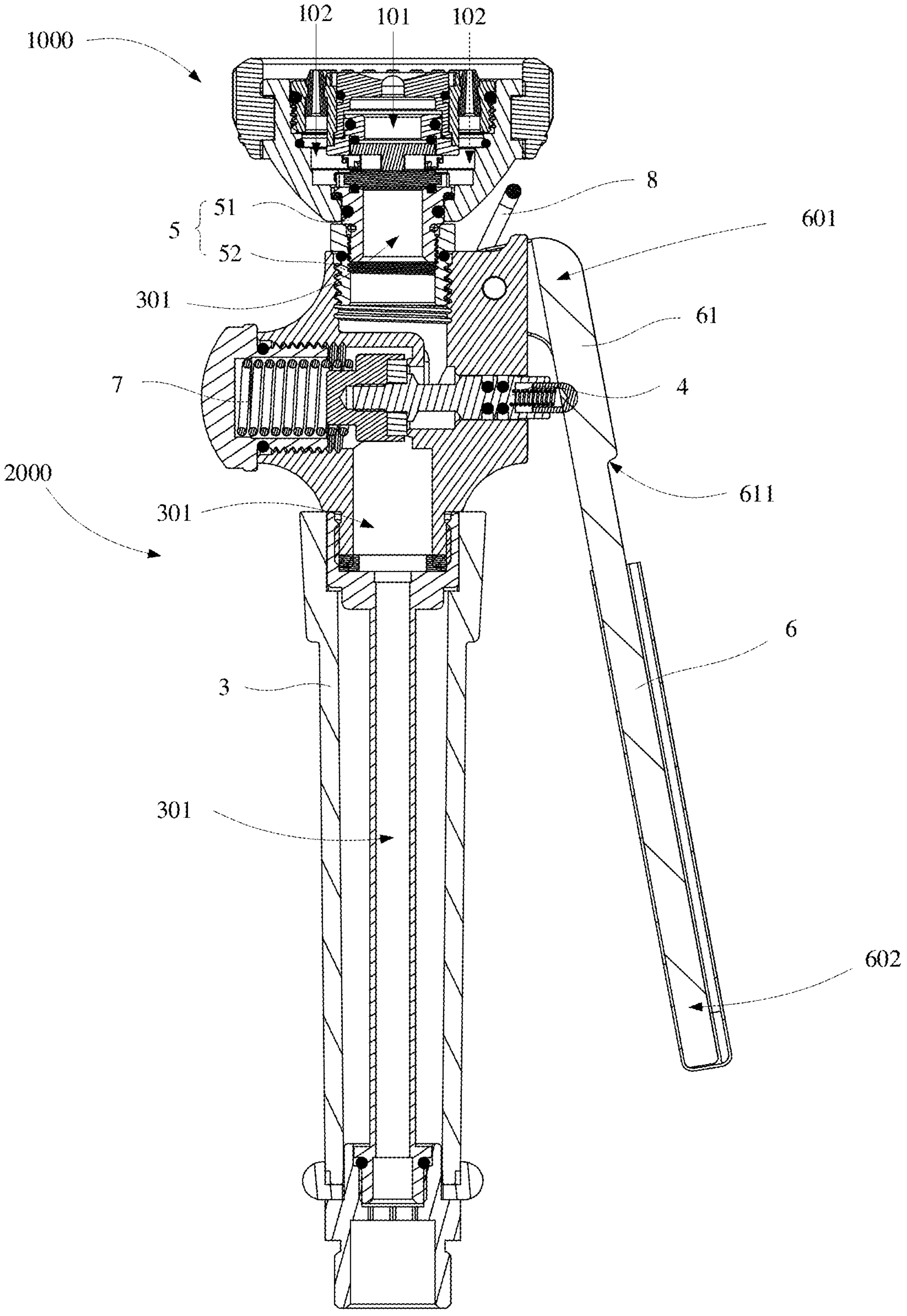
FIG. 1 is a sectional view of a handheld water sprayer according to an embodiment of the present disclosure.

- 1000, spray head; 101, first outlet channel; 102, second outlet channel; 103, third outlet channel;
- 1, housing; 11, mounting cavity; 111, second positioning groove; 12, annular boss; 121, through hole;
- 2, water dividing assembly;
- 21, second seat; 211, first outlet dividing channel; 212, second outlet dividing channel; 213, receiving groove; 214, first positioning groove; 215, second positioning boss;
- 22, second contact member; 221, third outlet dividing channel; 222, fourth outlet dividing channel; 223, top face; 224, bottom face; 225, side face; 226, first positioning boss;

23, water outlet member; 231, first water outlet head; 2310, first water outlet hole; 2311, sleeve; 232, second water outlet head; 2320, second water outlet hole;
24, mounting member; 241, nested boss;
2000, handle;
3, holding body; 31, limiting end; 32, top portion; 301, inlet channel; 3011, first connection channel; 3012, second connection channel; 302, blocking member; 3021, first connection opening; 3022, second connection opening; 3023, vertical channel;
4, pressing member; 41, one end; 42, the other end; 43, straight rod; 44, plug;
5, connecting seat; 501, upper end; 502, lower end;
51, first seat; 511, first inlet dividing channel; 512, upper seat; 5120, first boss; 513, lower seat; 5130, second boss; 52, first contact member; 521, second inlet dividing channel;
6, pressing rod; 601, first end; 602, second end; 61, snap boss; 611, abutting face;
7, resetting member;
8, snap ring.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIG. 1, a handheld water sprayer is provided in the present disclosure. The handheld water sprayer includes a handle 2000 and a spray head 1000. The handle 2000 includes a holding body 3 and a pressing member 4. The holding body 3 defines an inlet channel 301. The pressing member 4 is slidably mounted on the holding body 3 and extends into the inlet channel 301 for adjusting a flow rate of the inlet channel 301. The spray head 1000 is rotatably mounted on the holding body 3. The spray head 1000 defines a first outlet channel 101 and a second outlet channel 102. Rotating the spray head 1000 enables at least one of the first outlet channel 101 and the second outlet channel 102 to be communicated to the inlet channel 301. The first outlet channel 101 and the second outlet channel 102 are communicated to water outlets of different shapes or sizes, so the handheld water sprayer has different water outlet modes. Similarly, the spray head 1000 may further defines a third outlet channel 103 and a fourth outlet channel, etc. In the following, taking a case where only two outlet channels are defined in the spray head 1000 as an example for description.

Figure 2:
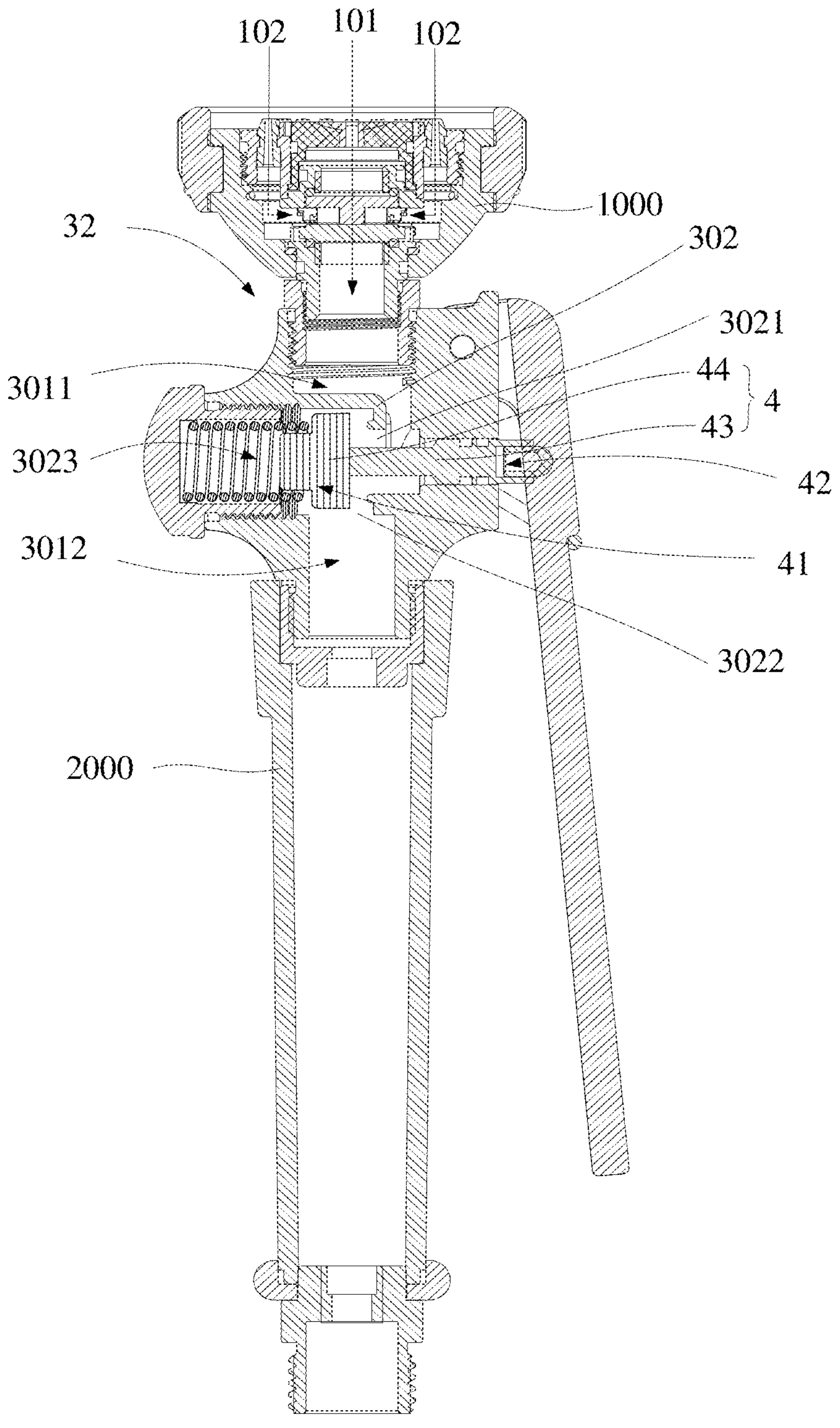
FIG. 2 is a sectional view of the handheld water sprayer according to another embodiment of the present disclosure.

The inlet channel 301 of the handle 2000 can be communicated to a water source. The pressing member 4 is mounted on the holding body 3. As shown in FIG. 2, one end 41 of the pressing member 4 is in the inlet channel 301, and the other end 42 is exposed outside the holding body 3 for user operation. When the user exerts an external force on the pressing member 4, the pressing member 4 can be driven to slide, thus closing or opening the inlet channel 301. A sliding stroke of the pressing member 4 can be controlled according to a magnitude of the external force exerted by the user, thereby adjusting a flow rate of the first inlet channel 301.

At least a part of a surface of the holding body 3 is in a shape of a cylinder or other shape which is convenient for the user to handle and operate. The surface of the holding body 3 is covered with an anti-slip material. In this way, the user can firmly handle the holding body 3 in a humid environment or during long time operation.

An overall shape of the spray head 1000 is cylinder or cone, or a combination of cylinder and cone. The spray head 1000 can rotate relative to the handle 2000 with an axis of the cylinder or cone as a rotation axis, enabling the user to quickly switch a water outlet mode. When the user rotates the spray head 1000, either the first outlet channel 101 or the second outlet channel 102 in the spray head 1000 can be communicated to the inlet channel 301 of the handle 2000. Alternatively, the first outlet channel 101 and the second outlet channel 102 can be simultaneously communicated to the inlet channel 301.

Figure 3:
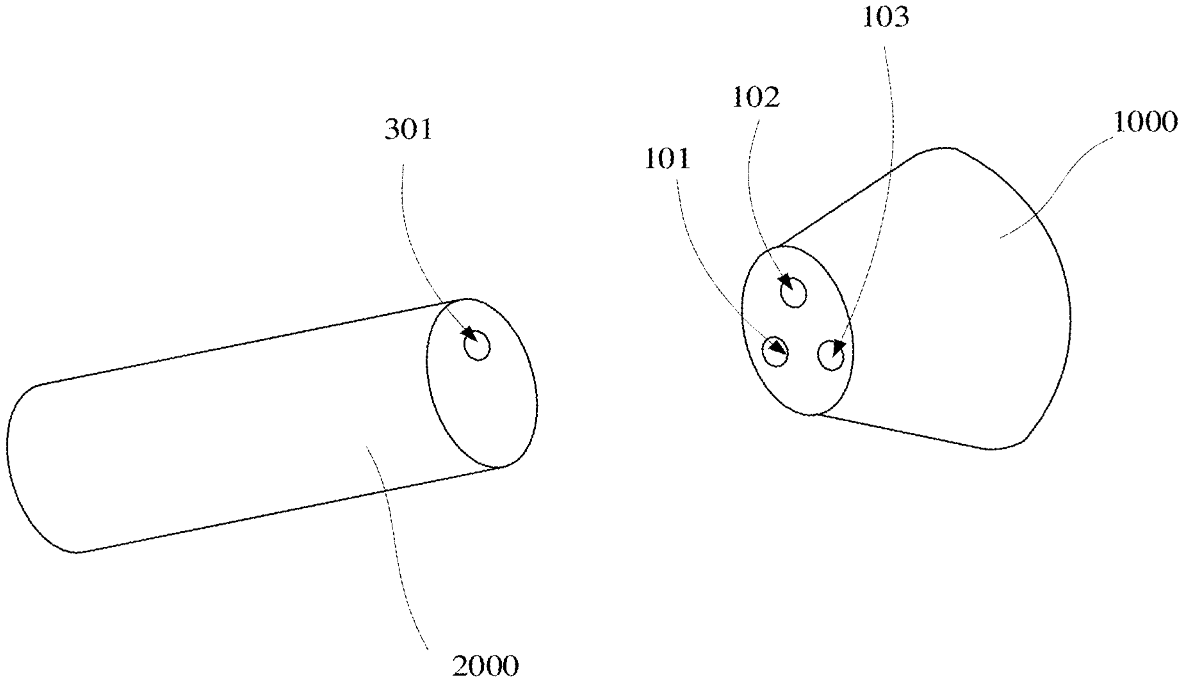
FIG. 3 is a schematic view of the inlet channel, a first outlet channel, the second outlet channel, and a third channel according to an embodiment of the present disclosure.

In one embodiment, the handheld water sprayer has two water outlet modes. Each of the first outlet channel 101 and the second outlet channel 102 corresponds to a respective one of the two water outlet modes. The two water outlet modes can be switched or used simultaneously by adjusting water passage of the first water outlet channel 101 and the second water outlet channel 102. For example, the water outlet mode corresponding to the first outlet channel 101 is a concentrated flow mode, which is suitable for scenarios such as vehicle washing, ground washing, or other stubborn stain removal that require high pressure and a large amount of water; the water outlet mode corresponding to the second outlet channel 102 is a spraying mode, which is suitable for plant irrigation, cleaning items with easily damaged surfaces, or other scenarios that require a large range and low impact; the two modes can also be enabled simultaneously to meet diverse usage requirements. In other embodiments, the handheld water sprayer further has a third or more water outlet modes. In this case, the spray head 1000 defines more than three outlet channels. As shown in FIG. 3, it illustrates an embodiment in which the spray head 1000 defines three outlet channels.

In one embodiment, the spray head 1000 is mounted on a top portion 32 of the holding body 3. A water outlet direction of the first outlet channel 101 and a water outlet direction of the second water outlet channel 102 are the same as a water inlet direction of the inlet channel 301. The pressing member 4 extends out of the holding body 3 from an outer side of the holding body 3 and is arranged close to the top portion 32. A sliding direction of the pressing member 4 is perpendicular to the water inlet direction of the inlet channel 301.

In the present embodiment, the water outlet direction of the first outlet channel 101 and the water outlet direction of the second outlet channel 102 are the same as the water inlet direction of the inlet channel 301, being in a straight through state. With no bends between the inlet channel 301 and the outlet channels, water flow resistance can be reduced. It is especially suitable for scenarios where a concentrated flow water outlet mode is required, such as kitchen cleaning or ground decontamination. The straight water flow makes an impact force more concentrated and improves cleaning effect.

The pressing member 4 is arranged at the outside of the holding body 3 and close to the top portion 32. In other words, the pressing member 4 is designed in an area where the user's thumb can operate conveniently. When in use, the user can hold the holding body 3 with a hand and press the pressing member 4 with the thumb to adjust the flow rate of the inlet channel 301, enabling the user to hold the sprayer and adjust the flow rate with one hand, improving portability of the sprayer.

Figure 4:
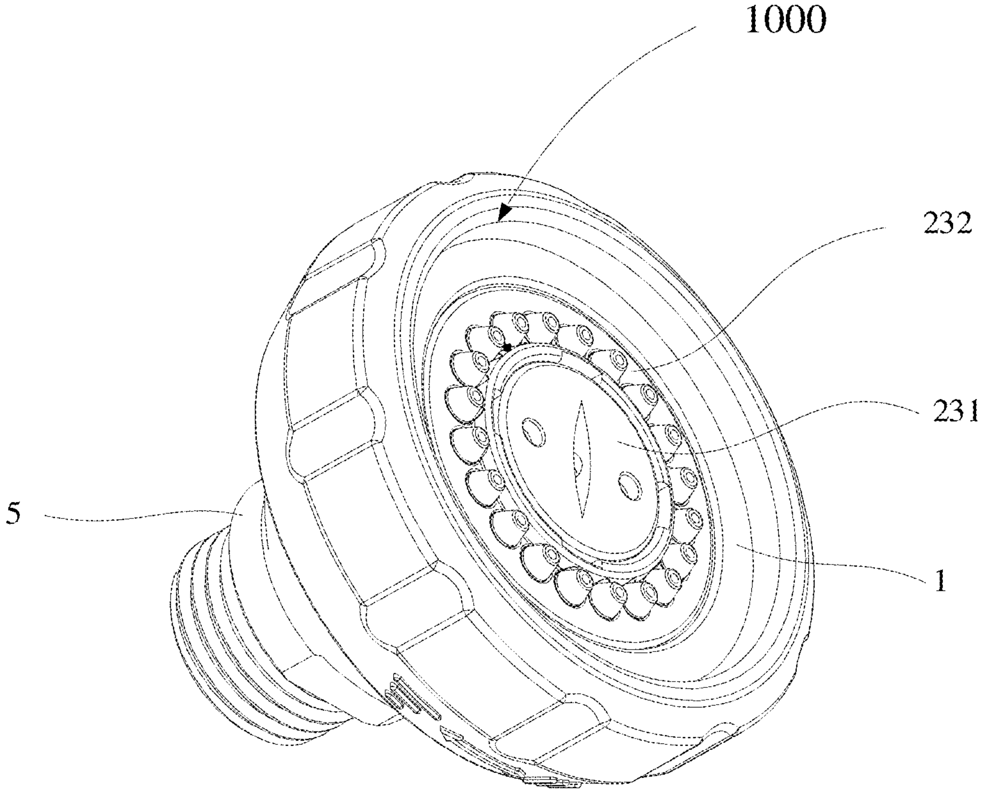
FIG. 4 is a schematic view of an overall structure of a spray head according to an embodiment of the present disclosure.
Figure 5:
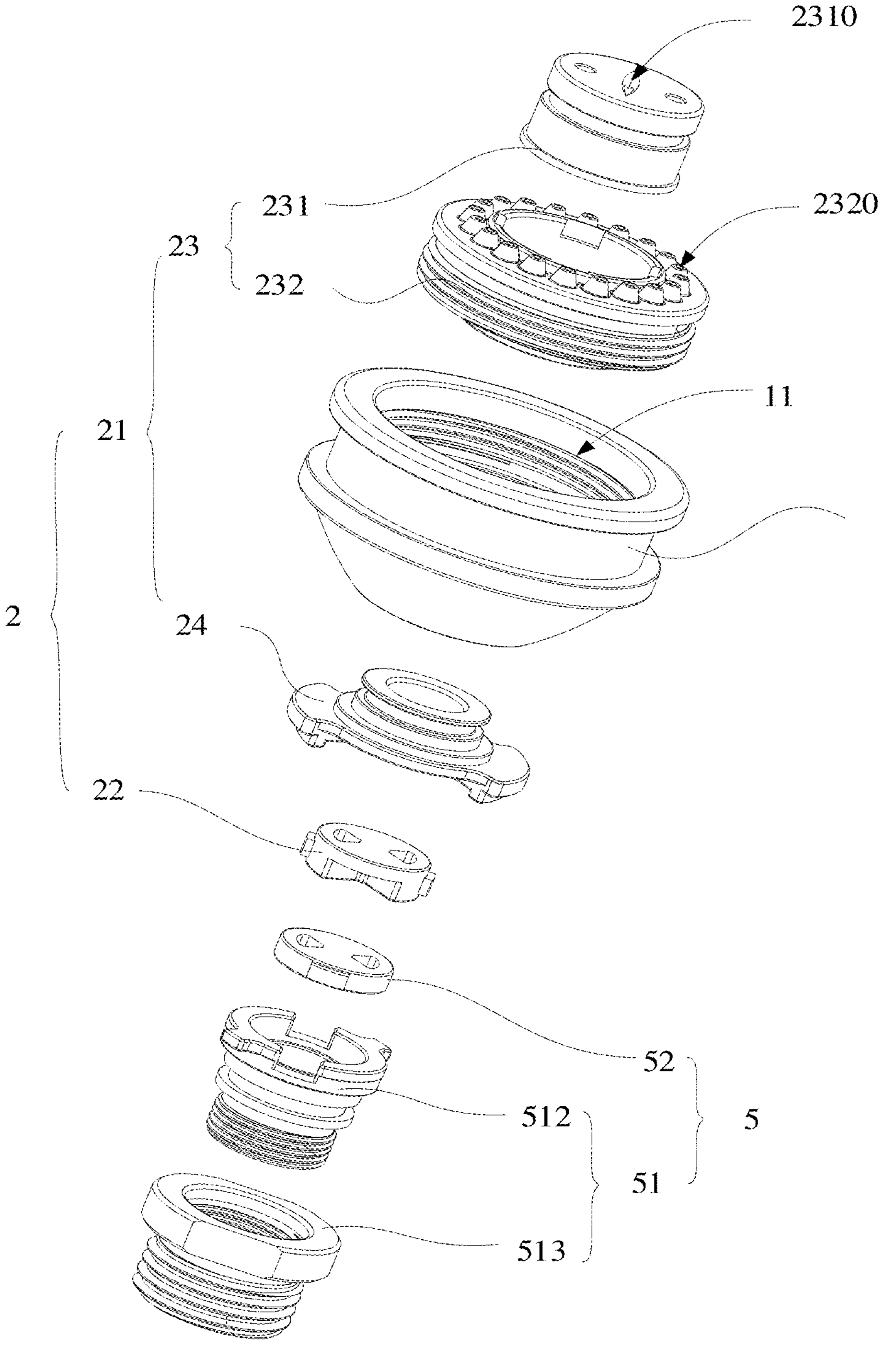
FIG. 5 is an exploded view of the spray head according to an embodiment of the present disclosure.
Figure 6:
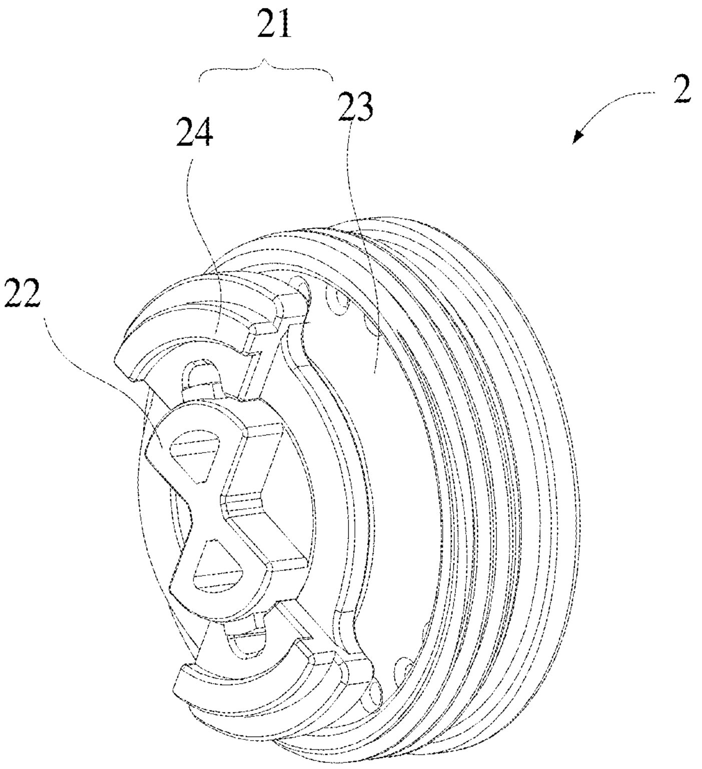
FIG. 6 is a schematic view of an overall structure of a water dividing assembly according to an embodiment of the present disclosure.

In one embodiment, referring to FIGS. 4-6, in this embodiment, the handle 2000 includes a connecting seat 5 connected to the spray head 1000. The inlet channel 301 penetrates through the connecting seat 5. The spray head 1000 includes a housing 1 and a water dividing assembly 2. The housing 1 is rotatably mounted on the connecting seat 5. The housing 1 defines a mounting cavity 11. The water dividing assembly 2 is mounted in the mounting cavity 11. The water dividing assembly 2 divides the mounting cavity 11 to a first outlet channel 101 and a second outlet channel 102. In other words, the first outlet channel 101 and the second outlet channel 102 are actually formed in the water dividing assembly 2. The water outlet mode can be switched by changing a relative position relationship between the water dividing assembly 2 and the connecting seat 5.

Specifically, the connecting seat 5 connects the holding body 3 with the housing 1. The connecting seat 5 is fixedly mounted on the holding body 3. The housing 1 is rotatable relative to the connecting seat 5. The inlet channel 301 goes through the connecting seat 5. A water flow can enter the mounting cavity 11 of the housing 1 from the connecting seat 5. In this way, the water flow from an outside can be introduced to an interior of the spray head 1000. The housing 1 can be made of a material such as metal or plastic. The water dividing assembly 2 divides the mounting cavity 11 of the housing 1 into two parts to form the first outlet channel 101 and the second outlet channel 102. When the spray head 1000 is rotated, the water dividing assembly 2 rotates synchronously with the housing 1, and a relative rotation occurs between the water dividing assembly 2 and the connecting seat 5. In this way, a communication relationship between the inlet channel 301 and one of the first outlet channel 101 and the second outlet channel 102 can be switched.

In one embodiment, the water dividing assembly 2 and the connecting seat 5 are closely attached to each other to prevent the first outlet channel 101 and the second outlet channel 102 from being communicated with each other in an area between the water dividing assembly 2 and the connecting seat 5. If there is a gap between the water dividing assembly 2 and the connecting seat 5, water in the inlet channel 301 may flow simultaneously to the first outlet channel 101 and the second outlet channel 102 from this gap. In other words, the first outlet channel 101 and the second outlet channel 102 are communicated via this gap. Thus, when the spray head 1000 is rotated, the communication relationship between the inlet channel 301 and the one of the first outlet channel 101 and the second outlet channel 102 cannot be switched. Therefore, the water dividing assembly 2 and the connecting seat 5 should be closely attached to each other to avoid water flow entering the area between the water dividing assembly 2 and the connecting seat 5, and ensure that the water flow can selectively enter one of the first outlet channel 101 and the second outlet channel 102 according to the user's requirements, thereby realizing accurate switching of the water outlet mode. For example, when the user chooses to only have the first outlet channel 101 communicated to the inlet channel 301, the water flow in the inlet channel 301 is prevented from flowing through the area between the water dividing assembly 2 and the connecting seat 5 to the second outlet channel 102, thus avoiding a disordered water outlet mode.

In one embodiment, referring to FIG. 5, the connecting seat 5 includes a first seat 51 and a first contact member 52 mounted on the first seat 51. The inlet channel 301 penetrates through the first seat 51 and the first contact member 52. The water dividing assembly 2 includes a second seat 21 and a second contact member 22 mounted on the second seat 21. Each of the first outlet channel 101 and the second outlet channel 102 penetrates through the second seat 21 and the second contact member 22. The water outlet mode can be switched through a relative rotation of the first contact member 52 and the second contact member 22. In addition, the first contact member 52 and the second contact member 22 are closely attached to each other so as to prevent the first outlet channel 101 and the second outlet channel 102 from being communicated at an area between the first contact member 52 and the second contact member 22, thereby avoiding the aforementioned problem of the disordered water outlet mode.

The first contact member 52 is fixedly mounted at the upper end 501 of the first seat 51. The inlet channel 301 allows water to only pass through the first contact member 52 into the mounting cavity 11, and moreover, an upper face of the first contact member 52 is in contact with the second contact member 22. The second contact member 22 is fixedly mounted on a side of the second seat 21 facing the connecting seat 5. Each of the first outlet channel 101 and the second outlet channel 102 is defined though the second contact member 22 and is communicated to the inlet channel 301 only from the second contact member 22. Moreover, a lower face of the second contact member 22 is in contact with the first contact member 52. In this embodiment, to a certain degree, the first contact member 52 is independent from the connecting seat 5, and the second contact member 22 is independent from the water dividing assembly 2. Each of the first contact member 52 and the second contact member 22 is made of a wear resistant material, such as a ceramic material. In this way, a problem that a face of the first contact member 52 in contact with the second contact member 22 and a face of the second contact member 22 in contact with the first contact member 52 are prone to wear and tear during long term and high frequency use can be solved. Other parts of the connecting seat 5 and the water dividing assembly 2, such as the first seat 51 and the second seat 21, are made of materials such as metal and plastic to meet respective strength or toughness requirements.

In one embodiment, in order to ensure a smooth relative rotation between the first contact member 52 and the second contact member 22, each of the face of the first contact member 52 in contact with the second contact member 22 and a face of the second contact member 22 in contact with the first contact member 52 is smooth. Processing methods such as polishing can be used to reduce pits or processing patterns on the faces and reduce friction coefficients of the faces, so as to enable the first contact member 52 and the second contact member 22 to rotate relative to each other as smooth as possible.

Figure 7:
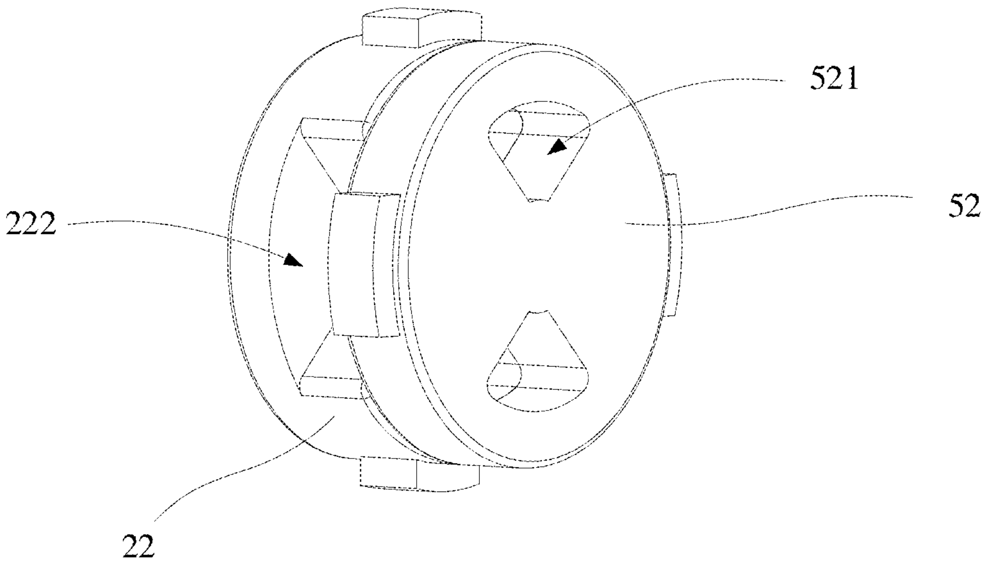
FIG. 7 is a structural view of a first contact member and a second contact member according to an embodiment of the present disclosure, illustrating a contact state between the first contact member and the second contact member.
Figure 8:
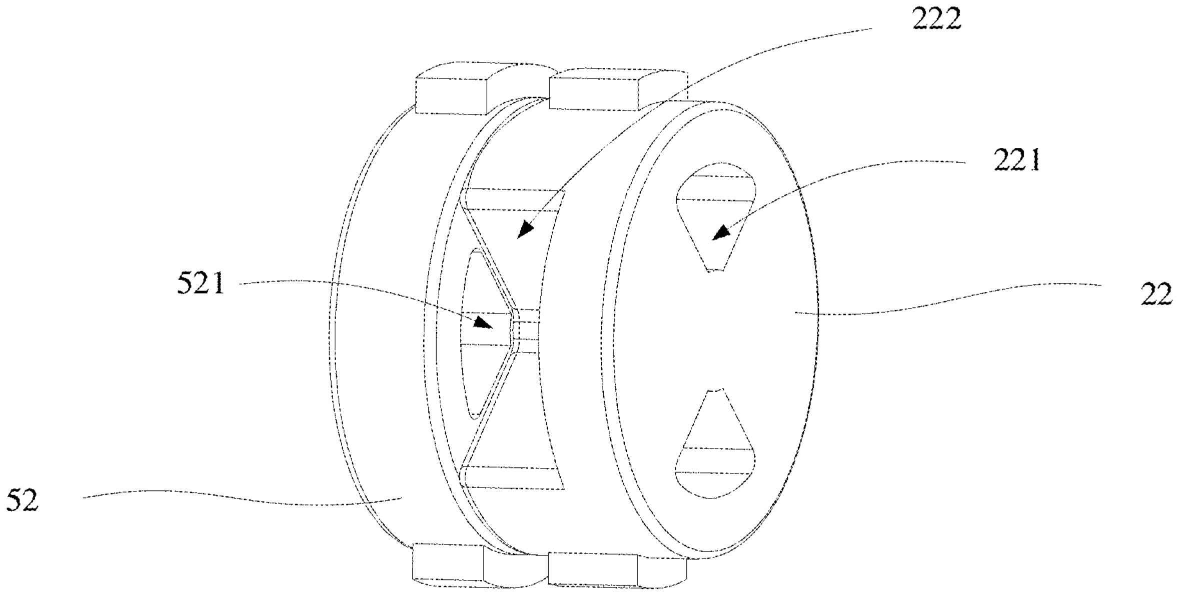
FIG. 8 is a structural view of the first contact member and the second contact member according to an embodiment of the present disclosure, illustrating another contact state between the first contact member and the second contact member.
Figure 14:
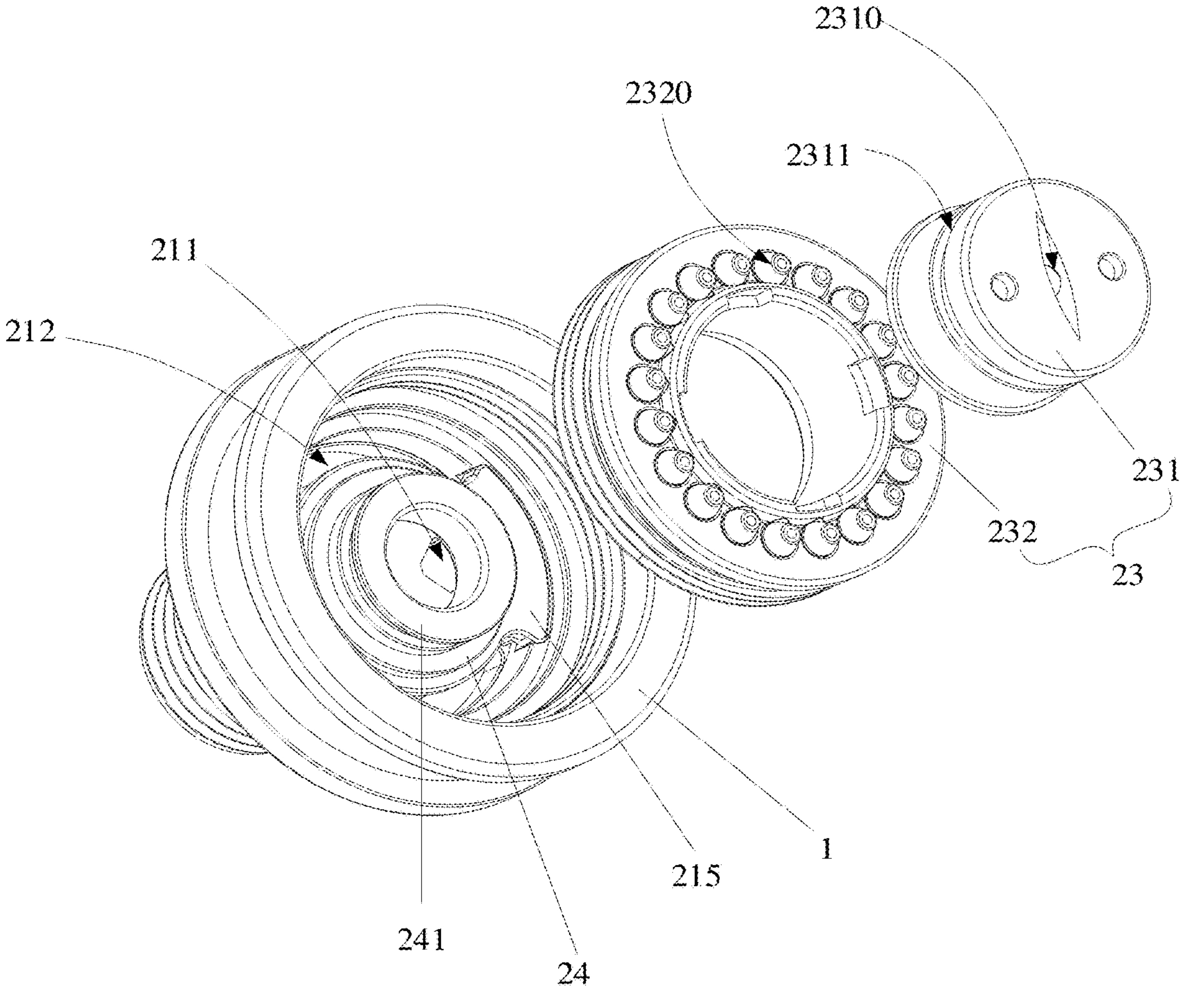
FIG. 14 is an exploded view of a water outlet member according to an embodiment of the present disclosure.

In one embodiment, as illustrated in FIGS. 6-8, the second seat 21 defines a first outlet dividing channel 211 and a second outlet dividing channel 212. The second contact member 22 defines at least one third outlet dividing channel 221 and at least one fourth outlet dividing channel 222. The first outlet dividing channel 211 and the at least one third outlet dividing channel 221 are communicated to each other to form the first outlet channel 101, and the second outlet dividing channel 212 and the at least one fourth outlet dividing channel 222 are communicated to each other to form the second outlet channel 102. Referring to FIG. 14, the first outlet dividing channel 211 is formed in the middle of the second seat 21, and the second outlet dividing channel 212 is cooperatively defined by the second seat 21 and an inner wall of the housing 1 corresponding to the mounting cavity 11.

Figure 9:
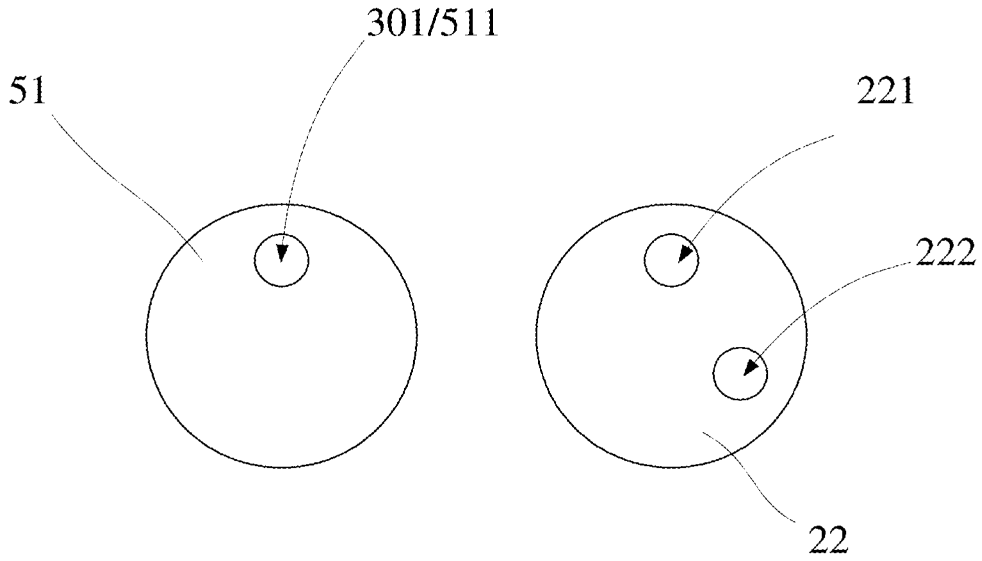
FIG. 9 is a schematic view of the first contact member and the second contact member according to an embodiment of the present disclosure.

In some embodiments, the at least one third outlet dividing channel 221 and the at least one fourth outlet dividing channel 222 are switched to pass water through the second contact member 22. Then neither the at least one third outlet dividing channel 221 nor the at least one fourth outlet dividing channel 222 can be communicated to a rotation center of the second contact member 22, while the at least one third outlet dividing channel 221 or the at least one fourth outlet dividing channel 222 should be defined eccentrically, as shown in FIG. 9.

Figure 13:
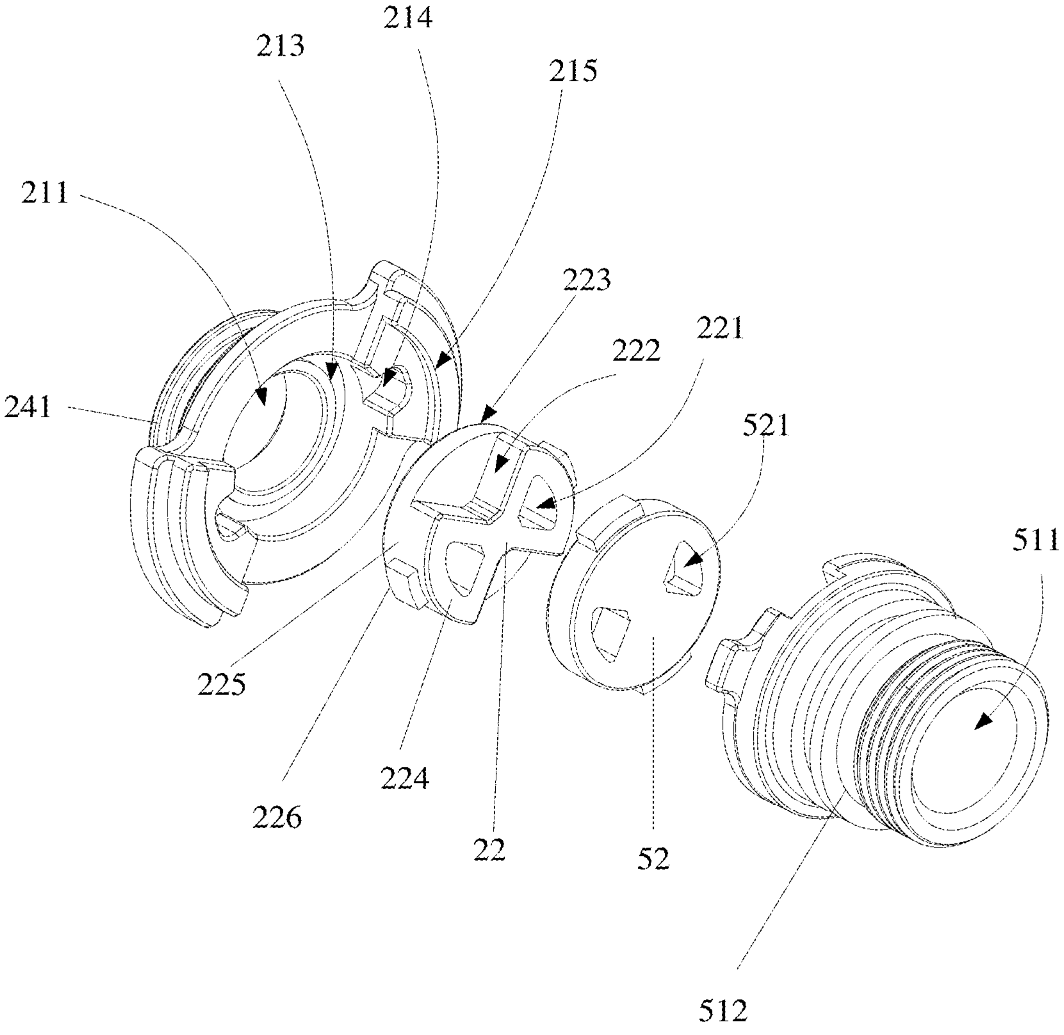
FIG. 13 is an exploded view of a mounting seat, the first contact member, the second contact member, and an upper seat according to an embodiment of the present disclosure.

As illustrated in FIG. 13, the second contact member 22 has a top face 223, a bottom face 224, and a side face 225. Each of the at least one third outlet dividing channel 221 penetrates through the second contact member 22 from the bottom face 224 to the top face 223, and each of the at least one the fourth outlet dividing channel 222 penetrates through the second contact member 22 from the bottom face 224 to the side face 225.

Specifically, the at least one third outlet dividing channel 221 and the at least one fourth outlet dividing channel 222 can be formed by hole-like structures opened in the second contact member 22, or be formed by notch structures opened in the second contact member 22.

Figure 10:
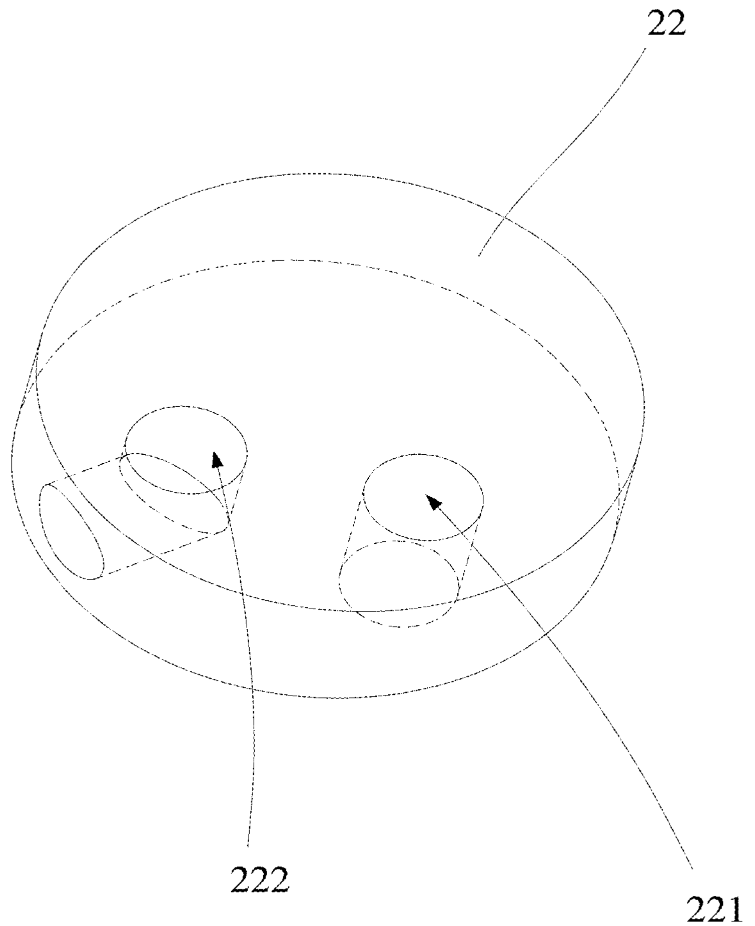
FIG. 10 is a structural view of the second contact member according to an embodiment of the present disclosure, illustrating a fourth outlet channel in a shape of "L".

For example, in one embodiment shown in FIG. 10, the second contact member 22 is mounted in the first outlet dividing channel 211. The number of the at least one third outlet dividing channel 221 is one, and the number of the at least one fourth outlet dividing channel 222 is also one. The third outlet dividing channel 221 is a vertical hole-like channel penetrating through the second contact member 22 from the bottom face 224 to the top face 223. An upper end of the third outlet dividing channel 221 may be communicated to the first outlet dividing channel 211, and a lower end of the third outlet dividing channel 221 may be communicated to the inlet channel 301. The fourth outlet dividing channel 222 is an "L" shaped hole-like channel penetrating through the second contact member 22 from the bottom face 224 to the side face 225, and a side end of the fourth outlet dividing channel 222 may be communicated to the second outlet dividing channel 212, and a lower end of the fourth outlet dividing channel 222 may be communicated to the inlet channel 301.

For example, in another embodiment shown in FIG. 8, the second contact member 22 is mounted in the first outlet dividing channel 211. Each of the at least one third outlet dividing channel 221 is a vertical hole-like channel penetrating through the second contact member 22 from the bottom face 224 to the top face 223, and an upper end of the each of the at least one third outlet dividing channel 221 may be communicated to the first outlet dividing channel 211, and a lower end of the each of the at least one third outlet dividing channel 221 may be communicated to the inlet channel 301. The second contact member 22 defines a notch communicated the bottom face 224 to the side face 225, and the notch forms the at least one fourth outlet dividing channel 222.

Therefore, as long as the first contact member 52 and the second contact member 22 form a water passing structure after being mounted in contact with each other, and both the water passing structure independently formed by the second contact member 22 and the water passing structure cooperatively defined by the first contact member 52 and the second contact member 22 can be considered as the at least one third outlet dividing channel 221 or the at least one fourth outlet dividing channel 222 opened in the second contact member 22. The second outlet dividing channel 212 is an annular water flow channel cooperatively defined by the second seat 21 and the inner wall of the housing 1 corresponding to the mounting cavity 11. In this case, the second contact member 22 may be mounted in the first outlet dividing channel 211, and only a special design for the second outlet dividing channel 212 is required. To facilitate manufacture of the second contact member 22, each of the at least one fourth outlet dividing channel 222 is designed as a notch manner. When it is required to switch to the second outlet channel 212 for water outlet, the inlet channel 301 is enabled to be communicated to the notch. In this way, a direction of a water flow in a straight flow direction is changed after passing through the notch, so as to guide the water flow to the annular second outlet dividing channel 212.

In one embodiment, as the at least one third outlet dividing channel 221 and the at least one fourth outlet dividing channel 222 are required to be designed eccentrically, and a single aperture has a relatively large limitation on the flow rate. Therefore, in some embodiments, with reference to FIG. 13, the first seat 51 defines only one first inlet dividing channel 511, and the first contact member 52 defines at least two second inlet dividing channels 521. Each of at least two inlet dividing channels 521 is communicated to the first inlet dividing channel 511. Each of the number of the at least one third outlet dividing channel 221 and the number of the at least one fourth outlet dividing channel 222 is consistent with the number of the at least two second inlet dividing channels 521. Each of the at least one third outlet dividing channel 221 and the at least one fourth outlet dividing channel 222 is capable of being communicated to a respective one of the at least two second inlet dividing channels 521.

Figure 11:
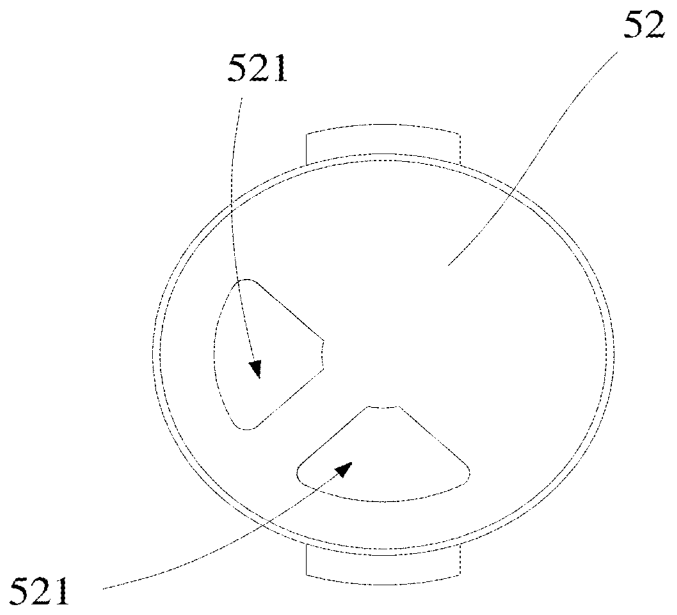
FIG. 11 is a structural view of the first contact member according to an embodiment of the present disclosure, illustrating a distribution of the second inlet dividing channels.

For example, as shown in FIG. 11, the first contact member 52 defines two second inlet dividing channels 521, and the two second inlet dividing channels 521 are circumferentially distributed within a certain angle range around a center of the first contact member 52.

Figure 12:
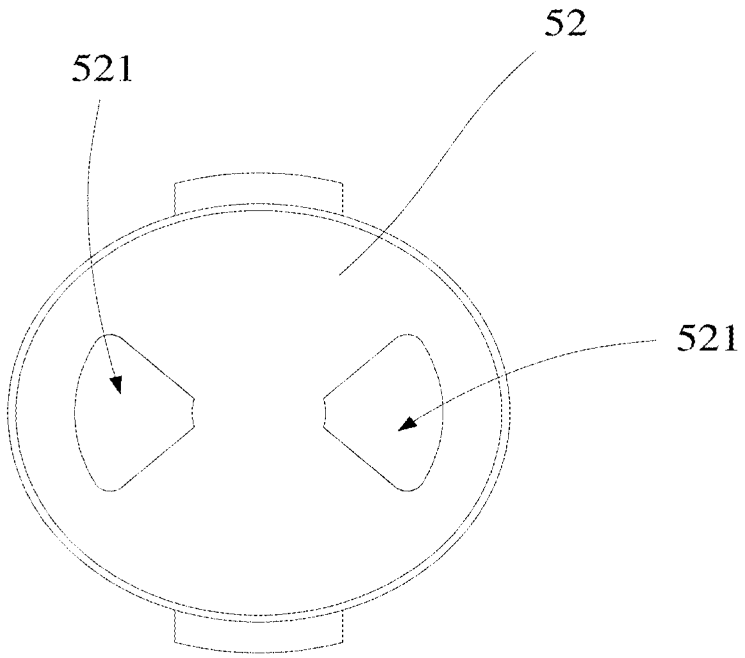
FIG. 12 is a structural view of the first contact member according to an embodiment of the present disclosure, illustrating another distribution of the second inlet dividing channels.

For example, referring to FIGS. 12-13, the first contact member 52 defines two second inlet dividing channels 521, and the two second inlet dividing channels 521 are symmetrically arranged about the center of the first contact member 52. The second contact member 22 defines two third outlet dividing channels 221 and two fourth outlet dividing channels 222. The two third outlet dividing channels 221 are symmetrically arranged about the center of the second contact member 22, and the two fourth outlet dividing channels 222 are symmetrically arranged about the center of the second contact member 22. In this way, the first contact member 52 and the second contact member 22 can be utilized to a greater extent and the flow rate can be increased.

The first seat 51 defines a first inlet dividing channel 511 penetrating through an overall structure of the first seat 51. The first inlet dividing channel 511 is configured to introduce a water flow from the handle 2000. Each of the at least two second inlet dividing channels 521 opened in the first contact member 52 is communicated to the first inlet dividing channel 511, so as to realize a further division of the water flow. An increase in the number of the at least two second inlet dividing channels 521 increases a water inlet volume of the water flow, and moreover, improves uniformity of the water flow. In order to adapt to a water inlet mode of the first contact member 52 and keep a uniform flow state of the water flow, each of the number of the at least one third outlet dividing channel 221 and the number of the at least one fourth outlet dividing channel 222 is consistent with the number of the at least two second inlet dividing channel 521.

In one embodiment, referring to FIGS. 7-8, each of the number of the at least two second inlet dividing channels 521, the number of the at least one third outlet dividing channel 221, and the number of the at least one fourth outlet dividing channel 222 is two. The two second inlet dividing channels 301 are centrosymmetrically distributed, the two third outlet dividing channels 221 are centrosymmetrically distributed, and the two fourth outlet dividing channels 222 are centrosymmetrically distributed. The symmetrically distributed water flow channels can reduce water pressure imbalance that may be generated by a single dividing channel, and improve stability and uniformity of water outlet.

In one embodiment, as illustrated to FIG. 13, the second seat 21 defines a receiving groove 213, and the second contact member 22 is accommodated in the receiving groove 213. The second seat 21 further defines a first positioning groove 214, the second contact member 22 is arranged with a first positioning boss 226, and the first positioning boss 226 is disposed in the first positioning groove 214, so as to prevent the second contact member 22 from rotating relative to the second seat 21.

In order to fix the second contact member 22 on the second seat 21, the receiving groove 213 of the second seat 21 matches an outer contour of the second contact member 22, and the receiving groove 213 provides a mounting position for the second contact member 22. In order to enable the second contact member 22 to rotate integrally with the second seat 21, the first positioning boss 226 is disposed in the first positioning groove 214, so that the second contact member 22 can be circumferentially fixedly mounted on the second seat 21. In one embodiment, there are two first positioning bosses 226 and two first positioning grooves 214 correspondingly.

Figure 16:
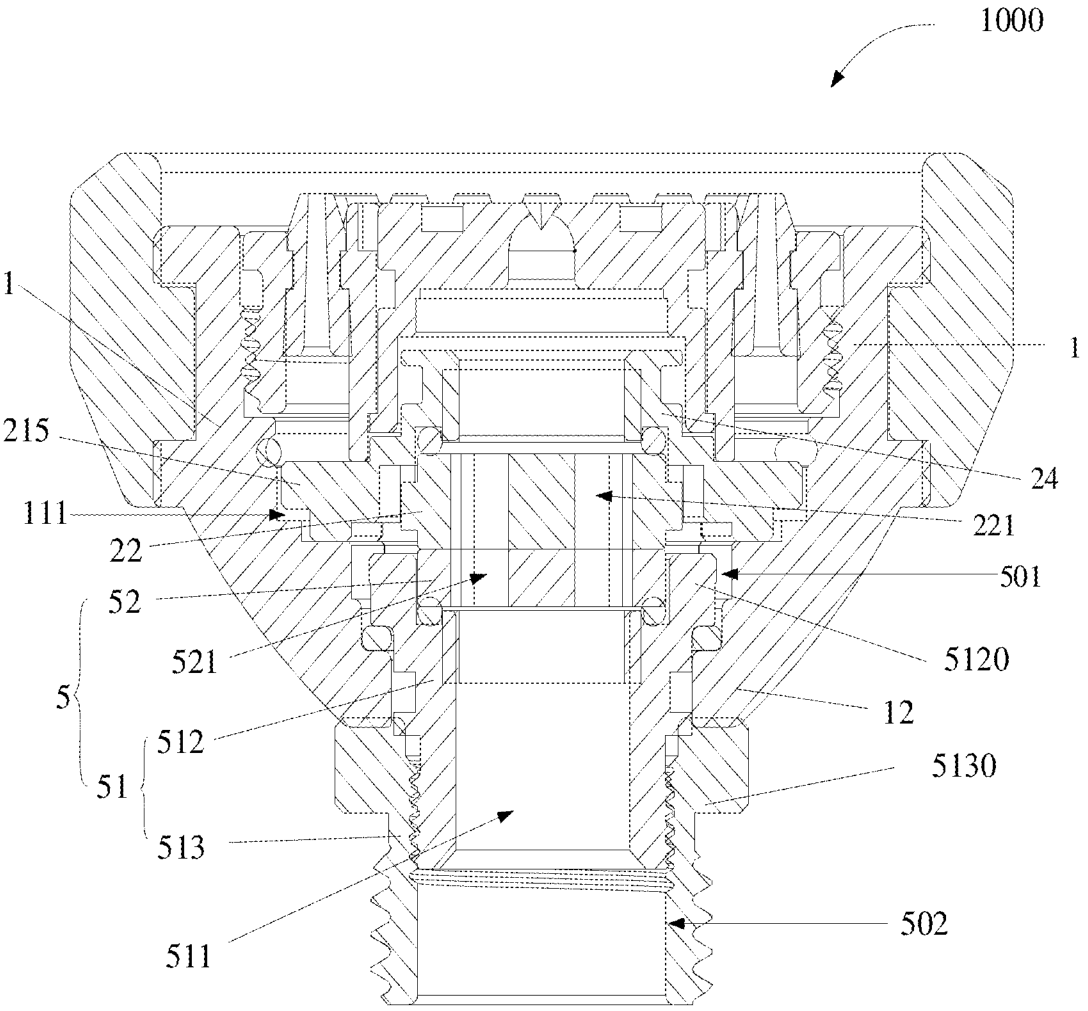
FIG. 16 is a sectional view of the spray head when the inlet channel is communicated with the first outlet channel according to an embodiment of the present disclosure.

In one embodiment, referring to FIGS. 13 and 16, the second seat 21 is arranged with a second positioning boss 215, and the housing 1 defines a second positioning groove 111 in the mounting cavity 11. The second positioning groove 111 extends vertically, and the second positioning boss 215 can be inserted into the second positioning groove 111 along an extending direction of the second positioning groove 111.

The second positioning groove 111 extends vertically, providing a top down guidance, which allows the second positioning boss 215 to be vertically inserted into the second positioning groove 111. Besides guiding and positioning, the engaging design between the second positioning boss 215 and the second positioning groove 111 can further prevent the second seat 21 from rotating. Since a shape of the second positioning boss 215 matches that of the second positioning groove 111, the second positioning boss 215 can be restricted in a circumferential direction after being engaged in the second positioning groove 111, thus preventing the second seat 21 from rotating relative to the housing 1 in the mounting cavity 111.

In one embodiment, as shown in FIG. 14, the second seat 21 includes a water outlet member 23 and a mounting member 24. The mounting member 24 is mounted in the mounting cavity 11, the second contact member 22 is mounted on the mounting member 24, and each of the first outlet dividing channel 211 and the second outlet dividing channel 212 penetrates through the mounting member 24. The water outlet member 23 defines a first water outlet hole 2310 and at least one second water outlet hole 2320. The first water outlet hole 2310 is configured to communicate the first outlet dividing channel 211 to the outside, and the at least one second water outlet hole 2320 is configured to communicate the second outlet dividing channel 212 to the outside. The first outlet dividing channel 211, the at least one third outlet dividing channel 221, and the first water outlet hole 2310 cooperatively form the first outlet channel 101, and the second outlet dividing channel 212, the at least one fourth outlet dividing channel 222, and the at least one second water outlet hole 2320 cooperatively form the second outlet channel 102. The water outlet member 23 and the mounting member 24 are detachably connected with each other, and the water outlet member 23 is detachably connected with the housing 1.

In this embodiment, the second seat 21 includes two parts, namely the mounting member 24 and the water outlet member 23, which is convenient for the user to maintain and replace during use. The water outlet member 23 and the second contact member 22 are both mounted on the mounting member 24 to cooperatively form the water dividing assembly 2. The second positioning boss 215 may be arranged on the mounting member 24 to connect the water dividing assembly 2 with the housing 1. In this way, the water dividing assembly 2 and the housing 1 can rotate synchronously.

When the water outlet member 23 is damaged, the water outlet member 23 can be individually disassembled for cleaning or replacement without replacing the entire spray head 1000, which can simplify maintenance and save costs.

In one embodiment, a notch is opened in an inner peripheral side of the mounting member 24. The inner peripheral side of the mounting member 24 corresponding to the notch and the inner wall of the housing 1 corresponding to the mounting cavity 11 cooperatively define the second outlet dividing channel 212. The notch in the second contact member 22 and the notch in the mounting member 24 are communicated to each other and cooperatively form the second outlet channel 102.

In some embodiments, referring to FIG. 14, the mounting member 24 is arranged with a nested boss 241, and the first outlet dividing channel 211 penetrates through the nested boss 241. The water outlet member 23 is arranged with a sleeve 2311. The first water outlet hole 2310 is communicated to an interior of the sleeve 2311. The sleeve 2311 sleeves a periphery of the nested boss 241. The second outlet dividing channel 212 surrounds the sleeve 2311. Specifically, the mounting member 24 and the water outlet member 23 are connected with each other by the sleeve 2311 sleeving the nested boss 241. In order to prevent water flow from leaking into the second outlet dividing channel 212 when passing through a connection area between the nested boss

241 and the sleeve 2311, the nested boss 241 and the sleeve 2311 are connected with each other in an interference fit, or a sealing component such as a sealing ring is disposed at a contact position between the nested boss 241 and the sleeve 2311.

Moreover, referring to FIG. 14, the water outlet member 23 includes a first water outlet head 231 and a second water outlet head 232. The first water outlet hole 2310 is defined in the first water outlet head 231, and the first water outlet head 231 is arranged with the sleeve 2311. The second water outlet head 232 sleeves a periphery of the first water outlet head 231. The at least one second water outlet hole 2320 is defined in the second water outlet head 232. The second water outlet head 232 is threadedly connected to the housing 1, thereby realizing a detachable connection between the second water outlet head 232 and the housing 1. There may be a plurality of second water outlet holes 2320, and the plurality of second water outlet holes 2320 are circumferentially distributed around the first water outlet head 231.

In one embodiment, the second water outlet head 232 detachably sleeves the periphery of the first water outlet head 231 and connected with the first water outlet head 231, thereby forming the water outlet member 23. The second water outlet head 232 is threadedly connected to the housing 1. That is to say, after the first water outlet head 231 and the second water outlet head 232 cooperatively form the water outlet member 23, the water outlet member 23 is further detachably connected to the housing 1 by threads, and each of the first water outlet head 231 and the second water outlet head 232 can be independently removed from the second seat 21.

The handheld water sprayer may be equipped with a plurality of different first water outlet heads 231 and second water outlet heads 232. Each of the plurality of first water outlet heads 231 or second water outlet heads 232 has the first water outlet hole 2310 or second water outlet hole 2320 with different shapes or sizes. This allows the user to replace or make various combinations of the first water outlet head 231 and the second water outlet head 232 as required, thereby providing more diverse usage modes.

Figure 15:
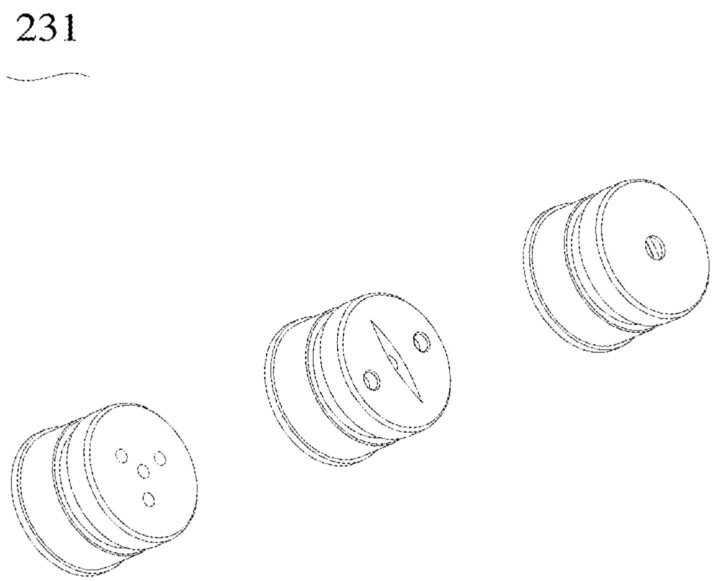
FIG. 15 is an exploded view of a first water outlet head according to an embodiment of the present disclosure.

For example, with reference to FIG. 15, the first water outlet head 231 is arranged to provide a straight flow water outlet mode. The first water outlet hole 2310 may be in a form of a single hole or multiple holes. The first water outlet hole 2310 in the form of single hole may be a circular hole to provide a direct shooting water flow or a long strip shaped hole to provide a fan shaped water flow. The first water outlet hole 2310 in the form of multiple holes can be arranged in a flat face to provide a more concentrated direct shooting water flow or in a convex face to provide a diffused water flow.

The second water outlet head 232 is arranged to spray out water. The second water outlet head 232 has a plurality of second water outlet holes 2320, and the plurality of second water outlet holes 2320 are circumferentially distributed around the first water outlet head 231. In this way, a uniform spraying effect can be achieved and the sprayed water may cover a larger area. An extending direction of at least a part of the plurality of second water outlet holes 2320 may be slightly outwardly inclined, so that the sprayed water is dispersed and a coverage area of the sprayed water outlet is increased.

In one embodiment, the handheld water sprayer may adopt various pulse modes and driving mechanisms to achieve more diverse water outlet effects and meet the requirements of specific scenarios. For example, the handheld water sprayer may provide a continuous straight shooting water outlet with a stable water flow, which is suitable for efficient cleaning of stubborn stains or target-concentrated rinsing tasks. The handheld water sprayer may be equipped with a pulse control device, so that the water outlet can be in a regular intermittent pattern, which is suitable for cleaning more sensitive surfaces or scenarios where water consumption needs to be reduced. By adjusting a pulse frequency, an intermittent rhythm of the water outlet can be changed from rapid dot shooting to slow intermittent, flexibly adapting to different requirements. Moreover, the handheld water sprayer may be combined with a driving mechanism, with the first water outlet head 231 rotatably arranged, so that the water flow of the water outlet forms a spiral trajectory during a spraying process.

Figure 17:
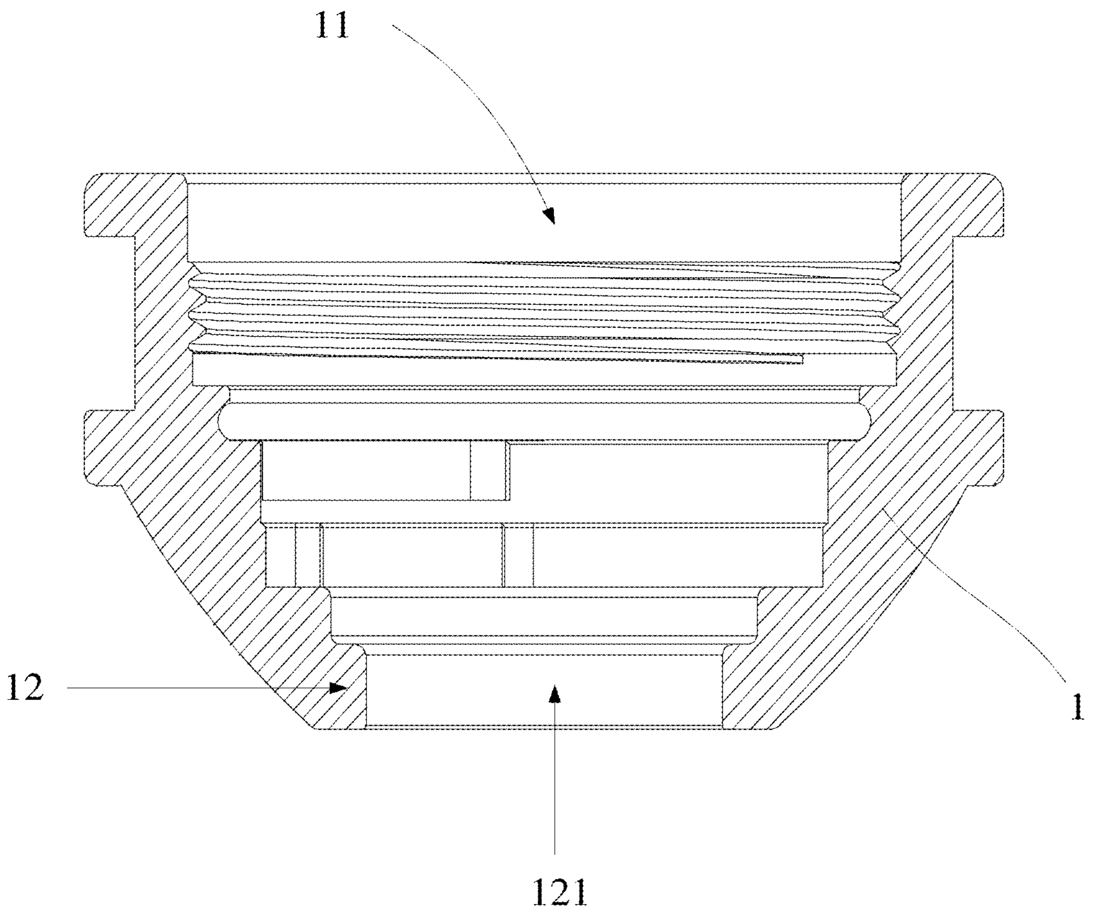
FIG. 17 is a sectional view of a housing according to an embodiment of the present disclosure.

In one embodiment, referring to FIGS. 16-17, in order to realize a rotation of the housing 1, the connecting seat 5 has an upper end 501 and a lower end 502. The upper end 501 of the connecting seat 5 extends into the mounting cavity 11, and the lower end 502 of the connecting seat 5 is located outside the housing 1. The upper end 501 of the connecting seat 5 is arranged with a first boss 5120, and the first boss 5120 abuts against the inner wall of the hosing 1 corresponding to the mounting cavity 11. The lower end 502 of the connecting seat 5 is arranged with a second boss 5130, and the second boss 5130 abuts against an outer wall of the housing 1. The housing 1 is clamped on the connecting seat 5 by the first boss 5120 and the second boss 5130. The housing 1 is rotatably arranged between the first boss 5120 and the second boss 5130.

An annular boss 12 adapted to the first boss 5120 and the second boss 5130 is arranged at a bottom of the housing 1. A through hole 121 is defined in the middle of the annular boss 12, and the through hole 121 is communicated to the mounting cavity 11. The upper end 501 of the connecting seat 5 passes through the through hole 121 and is disposed in the mounting cavity 11. In this way, the annular boss 12 is clamped between the first boss 5120 and the second boss 5130 of the connecting seat 5, but still retains a freedom of rotation, enabling the annular boss 12 to rotate around the connecting seat 5.

Specifically, as shown in FIG. 16, the first seat 51 includes an upper seat 512 and a lower seat 513. The upper seat 512 is arranged with the first boss 5120, the lower seat 513 is arranged with the second boss 5130. The upper seat 512 is threadedly connected to the lower seat 513, and the lower seat 513 is threadedly connected to the holding body 3.

When mounting the spray head 1000, the upper seat 512 is firstly inserted into the mounting cavity 11 from an upper part of the housing 1 and penetrates through the through hole 121, so that the first boss 5120 of the upper seat 512 enters the mounting cavity 11 of the housing 1 and is attached to the inner wall of the housing 1. Then, the lower seat 513 is performed a threaded connection with the upper seat 512 from the outside of the housing 1. During the threaded connection process, as the lower seat 513 is gradually tightened upwards, the first boss 5120 presses down on the inner wall of the housing 1 tightly, and meanwhile, the second boss 5130 is closely attached to the outer wall of the housing 1 from below, firmly clamping the housing 1 between the upper seat 512 and the lower seat 513.

The lower seat 513 is fixed to the holding body 3 via the threaded connection, thereby connecting the first seat 51 to the holding body 3. In this way, firmness of the spray head 1000 can be ensured, and it is convenient for disassembly and replacement when necessary.

In one embodiment, referring to FIG. 1, the handle 2000 further includes a pressing rod 6. The pressing rod 6 has a first end 601 and a second end 602. The first end 601 is hinged to the holding body 3, and the second end 602 is swingable around the first end 602. The pressing member 4 abuts against an area of the pressing rod 6 between the first end 601 and the second end 602, and is located close to the first end 601. When the second end 602 swings closer to the holding body 3, the pressing member 4 can be driven to slide into the inlet channel 301. Conversely, when the second end 602 swings away from the holding body 3, the pressing member 4 slides towards the outside of the holding body 3 correspondingly. Changing a sliding position of the pressing member 4 may correspondingly change the flow rate of the inlet channel 301.

Referring to FIG. 2, a blocking member 302 is arranged in the inlet channel 302. The blocking member 302 divides the inlet channel 301 into a first connecting channel 3011 and a second connecting channel 3012. A vertical channel 3023 is defined in the blocking member 302. An extending direction of the vertical channel 3023 is perpendicular to an extending direction of the first connecting channel 3011 and an extending direction of the second connecting channel 3012. The blocking member 302 is arranged with a first connection opening 3021 and a second connection opening 3022. The first connecting channel 3011 is communicated to the vertical channel 3023 through the first connection opening 3021, and the second connecting channel 3012 is communicated to the vertical channel 3023 through the second connection opening 3022. The pressing member 4 includes a straight rod 43 and a plug 44. The plug 44 is arranged in the vertical channel 3023 and can slide along the vertical channel 3023. The straight rod 43 passes through the first connection opening 3021 and is connected to the plug 44. While sliding outward, the straight rod 43 can drive the plug 44 to block the first connection opening 3021.

In some embodiments, the handle 2000 further includes a resetting member 7. The resetting member 7 cooperated with the pressing rod 6 can enhance convenience and flexibility of water outlet control of the handheld water sprayer. In the present embodiment, the pressing member 4 is arranged with a normally closed manner. Specifically, the resetting member 7 is arranged in the inlet channel 301 and is connected to the pressing member 4. In an example, the resetting member 7 is a spring. In an initial state, the resetting member 7 pushes against the pressing member 4, making the plug 44 block the first connection opening 3021. When an external force is applied to the second end 602 of the pressing rod 6, the plug 44 moves away from the first connection opening 3021, and thereby the first connection opening 3021 is opened, and the first connecting channel 3011 is communicated to the second connecting channel 3012. After the external force on the pressing rod 4 is released, an elastic force of the resetting member 7 can drive the plug 44 to slide back to the first connection opening 3021, so that the pressing member 4 returns to an initial position, ensuring that the handheld water sprayer is in a closed state when not in use, thus reducing water waste.

The pressing rod 6 is hinged to the holding body 3 at the first end 601 and abuts against the pressing member 4 close to the first end 601. During operation, when being pressed, the second end 602 of the pressing rod 6 swings towards the holding body 3 around a hinged point of the pressing rod 6 and the holding body 3, the pressing rod 6 pushes the pressing member 4 into the inlet channel 301, thereby adjusting an opening degree of the inlet channel 301 and controlling a flow rate of the water outlet. In addition, a position where the pressing rod 6 contacts the pressing member 4 is arranged with a smooth guiding face to ensure a uniform force on the pressing rod 6 during pressing. In this way, the elastic force of the resetting member 7 cooperates with a lever action of the pressing rod 6, which can not only make the pressing more labor saving but also ensure a reliable resetting of the pressing member 4 after the operation is completed.

Figure 18:
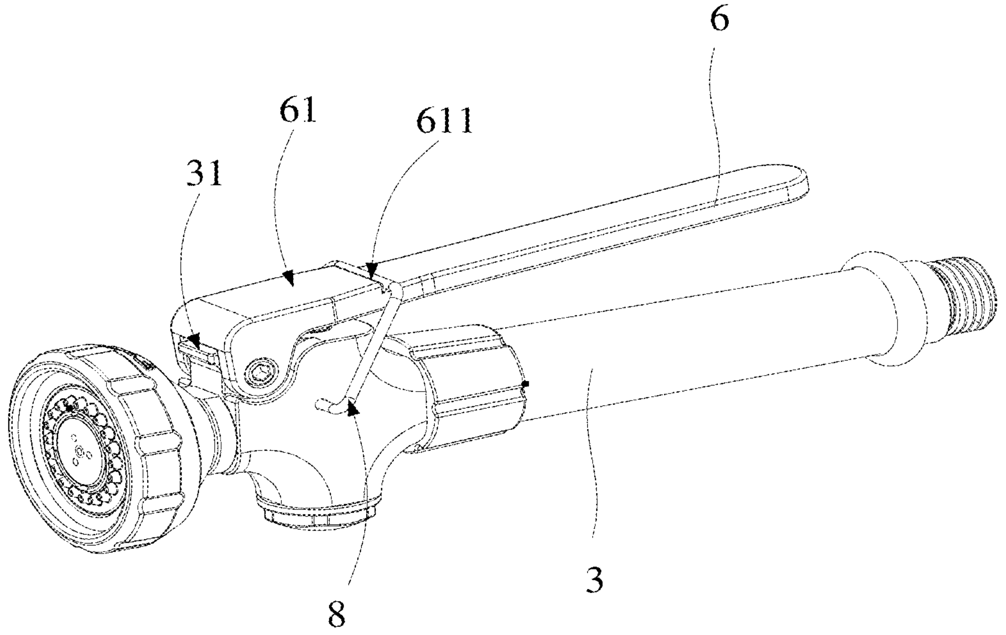
FIG. 18 is a structural view of the handheld water sprayer when a snap ring is in a locked state according to an embodiment of the present disclosure.
Figure 19:
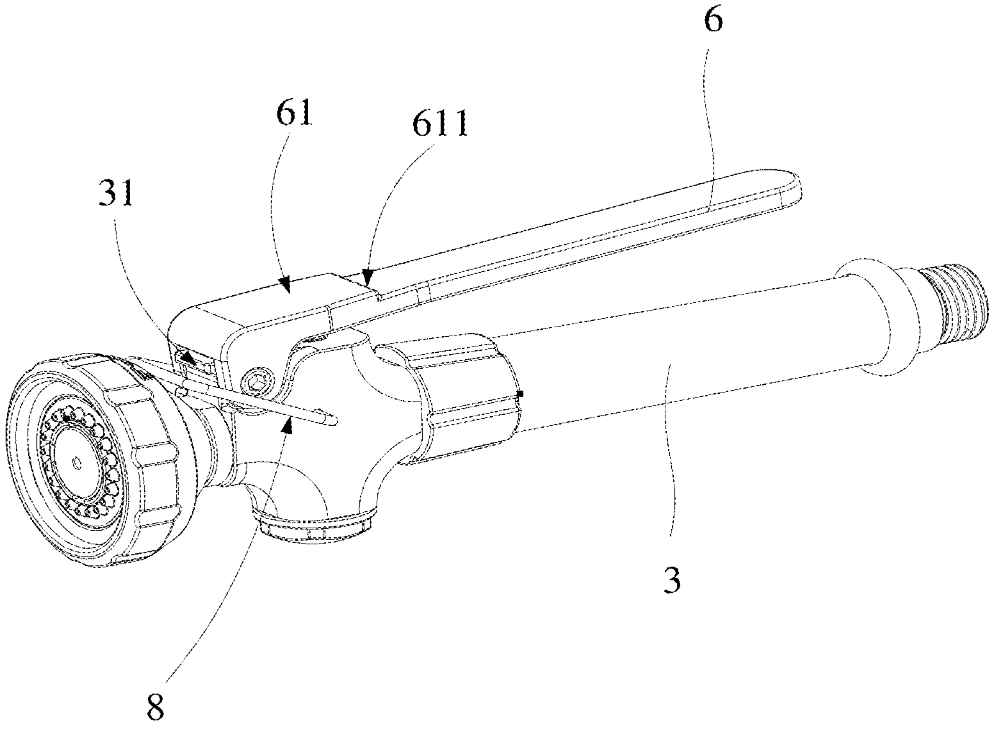
FIG. 19 is a structural view of the handheld water sprayer when the snap ring is in a released state according to an embodiment of the present disclosure.

In some embodiments, as shown in FIGS. 18-19, the handle 2000 further includes a snap ring 8 rotatably arranged on the holding body 3. The pressing rod 6 is arranged with a snap boss 61 at the first end 601. A side of the snap boss 61 facing the second end 602 has an abutting face 611. When the second end 602 swings closer to the holding body 3, the snap ring 8 can swing from the first end 601 to the second end 602 and abut against the abutting face 611.

In this embodiment, the snap ring 8 is configured to lock the pressing rod 6 at a specific angle, namely, to keep the pressing member 4 fixed at a certain position, thereby facilitating the user to continuously use the water outlet function for a long time in specific scenarios. The snap ring 8 surrounds an outer side of the snap boss 61 of the pressing rod 6. The snap ring 8 is rotatably mounted on the holding body 3, and a rotation center of the snap ring 8 is located between a hinged position of the pressing rod 6 and the holding body 3 and the abutting face 611. In this way, the snap ring 8 has a locked state and a released state.

The locked state refers to a state of the snap ring 8 as shown in FIG. 18. Specifically, when the user presses the second end 602 of the pressing rod 6, causing the second end 602 to swing closer to the holding body 3 and drive the pressing member 4 to slide for adjusting the opening degree of the inlet channel 301, the snap ring 8 can swing from the first end 601 of the pressing rod 6 to the abutting face 611. At this time, when the user stops pressing the pressing rod 6, the pressing rod 6 attempts to reset under an action of the resetting member 7, and the snap ring 8 may abut against the abutting face 611 of the snap boss 61 of the pressing rod 6, thereby locking the pressing member 4 at a current position. In this way, the opening degree of the inlet channel 301 can be kept constant, and the handheld water sprayer can provide a continuous and stable water flow.

The released state refers to a state of the snap ring 8 as shown in FIG. 19. Specifically, when the user presses the second end 602 of the pressing rod 6 once more, the snap ring 8 can swing from the abutting face 611 to the first end 601 of the pressing rod 6 until the snap ring 8 completely passes over the first end 601 of the pressing rod 6. At this time, the snap ring 8 releases a constraint on the pressing rod 6, and the pressing rod 6 is reset to an initial position driven by the resetting member 7. Meanwhile, the pressing member 4 slides accordingly, so that the inlet channel 301 is closed or the opening degree of the inlet channel 301 is reduced, thereby terminating or adjusting the water flow.

In this embodiment, an end of the holding body 3 hinged to the pressing rod 6 is arranged with a limiting end 31. The limiting end 31 is configured to limit a swing range of the pressing rod 6 during resetting. The resetting member 7 is connected with the pressing rod 6 and the holding body 3. When the user releases the pressing rod 6, the resetting member 7 drives the pressing rod 6 to swing away from the holding body 3 to complete the resetting. When the resetting is completed, the pressing rod 6 may abut against the limiting end 31, thereby preventing the pressing rod 6 from swinging too far away from the holding body 3. This is beneficial to limit the swing range of the pressing rod 6 within a range that is convenient for the user's hand operation.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A handheld water sprayer, comprising a handle and a spray head, wherein the handle comprises a holding body and a pressing member; the holding body defines an inlet channel, the pressing member is slidably mounted on the holding body, extends into the inlet channel, and is configured to adjust a flow rate of the inlet channel; the spray head is rotatably mounted on the holding body and defines a first outlet channel and a second outlet channel; rotating the spray head enables at least one of the first outlet channel and the second outlet channel to be communicated to the inlet channel;

wherein the handle comprises a connecting seat, the spray head comprises a housing and a water dividing assembly; the connecting seat is rotatably connected to the housing of the spray head;

the connecting seat comprises a first contact member, the water dividing assembly comprises a second contact member; the first contact member has at least one inlet dividing channel penetrating a thickness of the first contact member; the second contact member has at least one outlet dividing channel penetrating a thickness of the second contact member; the spray head is configured to be rotated to enable the at least one inlet dividing channel and the at least one outlet dividing channel to be communicated with or dis-communicated from each other;

a first surface of the first contact member facing the second contact member abuts against a second surface of the second contact member facing the first contact member without forming any gap between the first surface and the second surface;

the water dividing assembly further comprises a second seat, the second contact member is mounted on the second seat, the second seat defines a first outlet dividing channel and a second outlet dividing channel, the second contact member further defines at least one other outlet dividing channel; each of the at least one other outlet dividing channel of the second contact member does not penetrate the thickness of the second contact member and has an opening at a side wall of the second contact member;

the second contact member is mounted in the first outlet dividing channel, the first outlet dividing channel and the at least one outlet dividing channel are communicated to each other and form the first outlet channel, and the second outlet dividing channel and the at least one other outlet dividing channel are communicated to each other through the opening at the side wall of the second contact member and form the second outlet channel.

2. The handheld water sprayer as claimed in claim 1, wherein the spray head is mounted on a top portion of the holding body, a water outlet direction of the first outlet channel and a water outlet direction of the second outlet channel are the same as a water inlet direction of the inlet channel; the pressing member extends out of the holding body from an outer side of the holding body and is disposed close to the top portion, and a sliding direction of the pressing member is perpendicular to the water inlet direction of the inlet channel.

3. The handheld water sprayer as claimed in claim 1, wherein the inlet channel penetrates through the connecting seat; the housing defines a mounting cavity, the water dividing assembly is mounted in the mounting cavity, the mounting cavity is divided by the water dividing assembly to the first outlet channel and the second outlet channel, and the water dividing assembly and the connecting seat are closely attached to each other and are configured to prevent the first outlet channel and the second outlet channel from being communicated to each other in an area between the water dividing assembly and the connecting seat.

4. The handheld water sprayer as claimed in claim 3, wherein the connecting seat further comprises a first seat, and the first contact member is mounted on the first seat, and the inlet channel penetrates through the first seat and the first contact member;

each of the first outlet channel and the second outlet channel penetrates through the second seat and the second contact member;

the first contact member and the second contact member are closely attached to each other and are configured to prevent the first outlet channel and the second outlet channel from being communicated to each other in an area between the first contact member and the second contact member, and each of the first contact member and the second contact member is made of a wear resistant material.

5. The handheld water sprayer as claimed in claim 1, wherein the first outlet dividing channel is defined in a middle of the second seat, and the second outlet dividing channel is cooperatively defined by the second seat and an inner wall of the housing corresponding to the mounting cavity.

6. The handheld water sprayer as claimed in claim 5, wherein the second contact member further has a top face and a bottom face, each of the at least one outlet dividing channel penetrates through the second contact member from the bottom face to the top face, and each of the at least one other outlet dividing channel extends from the bottom face to the side face of the second contact member.

7. The handheld water sprayer as claimed in claim 1, wherein the first seat defines a first inlet dividing channel, a number of the at least one outlet dividing channel defined in the first contact member is at least two, each of the at least two inlet dividing channels is communicated to the first inlet dividing channel, each of a number of the at least one outlet dividing channel and a number of the at least one other outlet dividing channel is consistent with the number of the at least one inlet dividing channels, and each of the at least one outlet dividing channel and the at least one other outlet dividing channel is capable of being communicated to a respective one of the at least two inlet dividing channels.

8. The handheld water sprayer as claimed in claim 7, wherein each of the number of the at least two inlet dividing channels, the number of the at least one outlet dividing channel, and the number of the at least one other outlet dividing channel is two, the two inlet dividing channels are centrosymmetrically distributed, the two outlet dividing channels are centrosymmetrically distributed, and the two another outlet dividing channels are centrosymmetrically distributed.

9. The handheld water sprayer as claimed in claim 4, wherein the second seat defines a receiving groove, and the second contact member is received in the receiving groove; the second seat further defines a first positioning groove, the second contact member is arranged with a first positioning boss, and the first positioning boss is disposed in the first positioning groove and is configured to prevent the second contact member from rotating relative to the second seat.

10. The handheld water sprayer as claimed in claim 4, wherein the second seat is arranged with a second positioning boss, the mounting cavity has a second positioning groove, the second positioning groove extends vertically, and the second positioning boss is capable of being inserted into the second positioning groove along an extending direction of the second positioning groove.

11. The handheld water sprayer as claimed in claim 4, wherein the second seat comprises a water outlet member and a mounting member, the mounting member is mounted in the mounting cavity, the second contact member is mounted on the mounting member, and each of the first outlet channel and the second outlet channel penetrates through the mounting member;

the water outlet member defines a first water outlet hole and at least one second water outlet hole, the first water outlet hole communicates the first outlet channel to an outside area, the at least one second water outlet hole communicates the second outlet channel to the outside area, the water outlet member is connected with the mounting member, and the water outlet member is detachably connected with the housing.

12. The handheld water sprayer as claimed in claim 11, wherein the mounting member is arranged with a nested boss, the first outlet channel penetrates through the nested boss, the water outlet member is arranged with a sleeve, the first water outlet hole is communicated to an interior of the sleeve, and the sleeve sleeves a periphery of the nested boss.

13. The handheld water sprayer as claimed in claim 12, wherein the water outlet member comprises:

a first water outlet head, defining the first water outlet hole and arranged with the sleeve; and a second water outlet head, sleeving a periphery of the first water outlet head, defining the at least one second water outlet hole, and detachably connected with the housing.

14. The handheld water sprayer as claimed in claim 13, wherein a number of the at least one second water outlet hole is more than one, and the more than one second water outlet holes are circumferentially distributed around the first water outlet head.

15. The handheld water sprayer as claimed in claim 3, wherein the connecting seat has an upper end and a lower end, the upper end of the connecting seat is received in the mounting cavity, and the lower end of the connecting seat is located outside the housing;

the upper end of the connecting seat is arranged with a first boss, the first boss abuts against an inner wall of the housing corresponding to the mounting cavity, the lower end of the connecting seat is arranged with a second boss, the second boss abuts against an outer wall of the housing, and the housing is rotatably arranged between the first boss and the second boss.

16. The handheld water sprayer as claimed in claim 15, wherein the connecting seat comprises a first seat, the first seat comprises an upper seat and a lower seat, the upper seat is arranged with the first boss, the lower seat is arranged with the second boss, the upper seat is threadedly connected with the lower seat, and the lower seat is threadedly connected with the holding body.

17. The handheld water sprayer as claimed in claim 1, wherein the handle further comprises a resetting member, the resetting member is disposed in the inlet channel and is connected with the pressing member, and the resetting member is configured to drive the pressing member to slide out of the holding body.

18. The handheld water sprayer as claimed in claim 17, wherein the handle further comprises a pressing rod, the pressing rod has a first end and a second end, the first end is hinged to the holding body, the second end is swingable around the first end, the pressing member abuts against a position of the pressing rod between the first end and the second end and is arranged close to the first end, and when the second end swings close to the holding body, the pressing member is driven to slide into the inlet channel.

19. The handheld water sprayer as claimed in claim 18, wherein the handle further comprises a snap ring rotatably arranged on the holding body, the pressing rod is arranged with a snap boss at the first end, and the snap boss has an abutting face facing the second end;

when the second end swings close to the holding body, the snap ring is configured to swing from the first end to the second end and abut against the abutting face.

* * * * *